Figure 1:
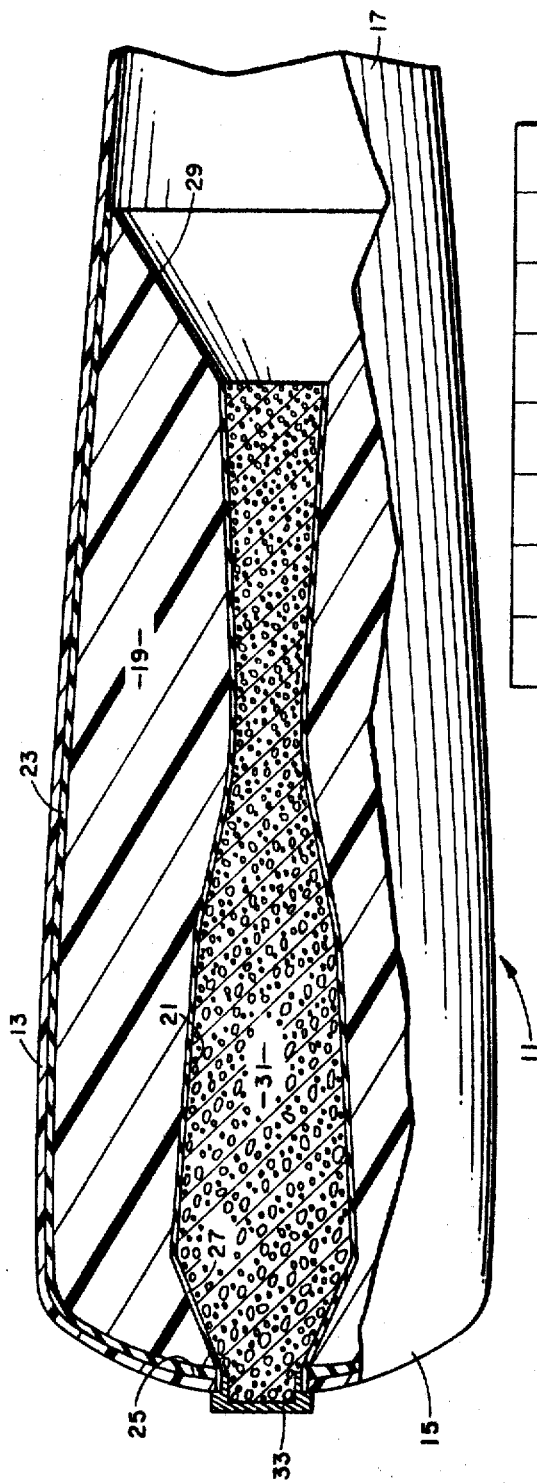

June 13, 1967     G. E. MILES ETAL     3,324,795
SOLID PROPELLANT
Filed April 16, 1964

INVENTORS
GEORGE E. MILES
BY MAURICE H. WHITLOCK

*Stuart W. Wohlgemuth*
ATTORNEY

United States Patent Office 3,324,795
Patented June 13, 1967

3,324,795
SOLID PROPELLANT
George E. Miles, West Newton, Mass., and Maurice H. Whitlock, Saratoga, Calif., assignors to North American Aviation, Inc.
Filed Apr. 16, 1964, Ser. No. 360,261
1 Claim. (Cl. 102—102)

This invention relates to a solid propellant rocket motor. More particularly, the invention relates to a novel internal mandrel for a solid propellant grain and a method of forming such grain.

The thrust of a solid propellant rocket is equal to the product of the mass flow rate and the effective exhaust velocity. If a large thrust is desired, the flow rate accordingly must be large. The hot gas weight flow rate is proportional to the exposed burning surface of the grain, the density of the propellant used in the grain, and the propellant linear burning rate which is the velocity at which the propellant is consumed in a direction normal to the burning surface. Since the density of various propellants is about the same, the variation in flow and, accordingly, thrust, must be accomplished through the careful selection of the propellant according to different linear burning rates.

In addition to selection of propellant according to the burning rate, one can affect the thrust by selecting the geometrical grain configuration to change the exposed burning surface of a grain. Since the burning rate does not vary too much for different propellant formulations, thrust and propellant flow rate are best increased by increasing the burning surface of the grain. If it is desired to lower or decrease the thrust for a corresponding longer burning duration, this can be obtained with a given propellant by exposing less burning area. In order to limit the exposed burning surface of propellant grains, incombustible materials are placed on the desired areas of the grain. These materials are known as restrictors or inhibitors.

The simplest geometry for a propellant grain is the end burning or cigarette burning geometry. Since a long grain can be used, the end burning is a method for obtaining long duration of thrust. However, internal-burning grains, star, center, and multi-perforated ones, are the most widely utilized to obtain a higher level of thrust by presenting larger burning surface areas. As a result, grains having complicated internal perforations are attempted. There are many inherent problems in the fabrication of grains with such internal configurations as well as problems relating to the structural stability. The problem is increased manifold if it is desired to restrict the internal burning surface of the perforation by means of a restricting or inhibiting material placed thereon.

Prior to the herein invention, in order to cast a solid propellant rocket with an internal perforation restricted from burning, the uncured solid propellant mix was poured into the mold or rocket case. A removable mandrel in the shape and location of the internal perforation was disposed in the case or mold prior to pouring mix therein. After curing the propellant at a given temperature for a sufficient length of time, the mandrel was withdrawn and the propellant surface and the perforation was restricted from burning by the application of an inhibitor. A typical inhibitor has the capability of bonding to the propellant surface. This method is obviously limited to internal shapes wherein the mandrel is capable of removal after the grain is cast. Additionally, it is quite difficult to apply the highly viscous restrictor material on the internal surface without deleteriously affecting the grain as can be readily apparent.

Thus, an object of this invention is to provide a solid propellant grain which is end-burning and has an internal perforation not limited as to its geometric configuration.

A further object of this invention is to provide a solid propellant end-burning grain wherein the mandrel is not removed from the mold.

Another object of this invention is to provide an internal perforated solid propellant grain wherein the perforation can be varied in all three planes providing for any desired thrust-time curve.

One other object of the invention is to provide a solid propellant grain at an internal perforation wherein the motor can be subjected to greater variations in temperature prior to use without cracking or failure.

A still further object of the invention is to provide a method of making solid propellant grains.

Other objects will be apparent from the following detailed description.

Figure 2:
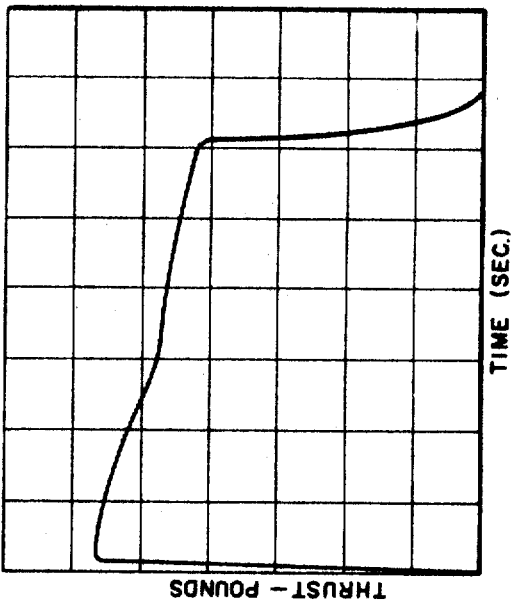

The herein invention relates to the use in a cast end-burning solid propellant rocket motor having a light-weight compressible, consumable mandrel which forms a restricted perforation in the propellant grain in order to achieve unusual ballistic and physical properties. It is contemplated to cast a solid propellant grain utilizing as a mandrel for the internal perforation a material such as Styrofoam which is polystyrene previously coated with an inhibitor material which is commonly utilized in solid propellant art. The mandrel is thus left in the cured propellant grain and is consumed during the actual firing thereof. In addition to obtaining unusual internal perforations in the grain, many other advantages are obtained from the consumable mandrel, as will be further explained with relation to the following detailed description in which:

FIGURE 1 is a sectional view of a solid propellant rocket motor utilizing the consumable mandrel concept of the invention; and FIG. 2 is a thrust-time curve for the motor as shown in FIG. 1.

With reference now to FIG. 1 there is shown a sectional view of a solid propellant rocket motor 11. It is noted in the particular examples shown, the outer case of the motor 13 is gradually tapered from the forward end 15 to the aft end 17. As a result, the outer circumference of propellant 19 varies along the length of the motor and the internal perforation 21 in the grain is varied according to desired thrust level. It should be understood, of course, that often it is desired to vary the internal perforation of a solid propellant motor regardless of variance of the outer diameter of the grain. The motor case 13 may be of a suitable material such as fiberglass or the like. It is often lined with an insulation material 23 which serves to protect and insulate the case from heat from the high temperature combustion gases of the propellant. The insulation material additionally serves as a restrictor for the burning of the grain. Such restrictors are often of a rubber-based material containing additives such as asbestos and the like. A typical composition of a restrictor is that disclosed in copending application, Serial No. 25,984, filed May 2, 1960, entitled "Insulated Solid Propellant Rocket Motor," O. D. Ratliff et al. The propellant 19 is restricted along the face 25 at the forward end and along the center perforation 27 in addition to the outer circumference as previously described. Thus, the burning of the propellant will progress from one face 29 at the rear end thereof.

In manufacturing the particular motor, the outer casing 13 is lined or coated with the restrictor-inhibitor 23. A mandrel 31 of a light-weight consumable material is inserted into the case and is supported by a cap 33 or other suitable tooling means. The propellant is then cast into the annular space between the case 23 and the mandrel 31. Next, the propellant is cured to a solid cohesive state. The unrestricted propellant face 29 may then be machined or formed by a removable mandrel, not shown, or other means. Finally, an expansion nozzle, not shown, can be then attached to the rear 17 of the case by conventional means.

As previously mentioned, the outer case 23 of the motor is shown tapering aft. To particularly illustrate the advantages of this invention, with an end-burning grain, such a tapered case would result in a progressive thrust-time curve. In other words, the thrust of the engine would increase with time since a larger amount of propellant was at the forward end. The thrust-time curve for the particular motor of FIG. 1 is shown in FIG. 2. It can be noted that the thrust-time curve is regressive rather than progressive. This is accomplished due to the mathematically calculated shape of the consumable mandrel 31. The shape of the mandrel could not be duplicated by conventional removable mandrels as the diameter is constricted at least at a point between the ends thereof so that it would be impossible to remove after the grain had been cast. For example, when the grain has a greater internal diameter towards its middle than at either end, removal could not be accomplished. Additionally, when the propellant is cast in a motor case having a closed head end such as that disclosed, the mandrel, if merely conically tapered away from the head end, could not be removed. Thus, if one end of the case is closed, and the diameter of the mandrel is less at the open end than at any point along the length thereof, such mandrel cannot be removed from the case. During the burning of the propellant 19 from the aft end to the forward end, along unrestricted face 29, progressively exposed portions of the consumable mandrel 31 are melted and burned away.

Because of its light weight, the mandrel does not significantly decrease the propellant mass fraction. Additionally, since it is consumed during burning, the presence of a mandrel of the invention does not increase the residual weight of the rocket motor after burning. Since propellant rate of expansion with change in temperature is different by from five to twenty times that of the case, the compressible feature of the consumable mandrel of the invention minimizes stress in the propellant grain. Thus with the consumable mandrel of the invention, the solid propellant can be subjected to greater variations in temperature prior to use without cracking or failure of the propellant grain.

Preferred, are foamed polymeric materials to serve as the mandrel constituent. In addition to the Styrofoam mentioned in the specific example, the invention would include but is not limited to the use of foamed polyurethanes, butadiene rubbers, polystyrenes, polyureas, phenolics, polyvinylchlorides, epoxy resins, polyisoprenes, and neoprenes. The main reason for foaming the materials is in order to obtain a low density so that the weight of the mandrel can be kept to a minimum. However, the most important criteria for the mandrel is that it be somewhat compressible in order to absorb expansion of the propellant grain, as previously mentioned, and that it, of course, be consumable upon exposure to the hot exhaust gases from the propellant.

The particular propellant formulation used in the particular example contained ammonium perchlorate as an oxidizer, metallic aluminum and a copolymer of acrylic acid and polybutadiene. Any composite or double base type propellant formulation is contemplated. A comprehensive listing of composite propellant formulations is found in U.S. Patent No. 3,022,149.

Though the particular example disclosed related to an internally restricted perforated grain, the use of unrestricted consumable mandrels is contemplated. In this instance, the mandrel would merely serve to provide an unusual contoured perforation which could not be had with a conventional removable one. When the mandrel is not restricted, it would be desirous to consume it as soon as possible after ignition of the motor. In order to facilitate this, the foamed mandrel may have incorporated therein combustible material such as ammonium perchlorate or the like.

It should be apparent that the consumable mandrel need not completely occupy the entire internal perforation. Thus, a conventional removable mandrel may be used in conjunction with that of the invention. The consumable mandrel would occupy that portion of the perforation wherein removal of a mandrel is not possible, i.e., the removable mandrel would have a maximum diameter less than the minimum internal diameter of the consumable mandrel at any point inboard of that minimum internal diameter.

Although the invention has been described and illustrated in detail, it is to be clearly understood that the same is by way of illustration and example only and is not to be taken by way of limitation, the spirit and scope of this invention being limited only by the terms of the appended claim.

We claim:

A solid propellant rocket motor comprising:
an outer casing,
a restrictor-inhibitor composition covering the inner walls of said casing,
a solid propellant composition disposed in said casing, and
a consumable and compressible mandrel disposed within said grain, wherein said mandrel is coated on its outer periphery with a burning restrictor composition.

References Cited
UNITED STATES PATENTS

| | | | |
|---|---|---|---|
| 2,524,591 | 10/1950 | Chandler | 102—49 |
| 2,694,364 | 11/1954 | Liljegren | 102—49 |
| 2,933,041 | 4/1960 | Ambrose | 102—98 |
| 3,009,385 | 11/1961 | Burnside | 86—1 |
| 3,034,393 | 5/1962 | Lieberman et al. | 86—1 |
| 3,062,147 | 11/1962 | Davis et al. | 60—35.6 |
| 3,104,523 | 9/1963 | O'Donnell | 60—35.6 |
| 3,128,600 | 4/1964 | Oldham | 60—35.6 |
| 3,137,126 | 6/1964 | Madison | 102—98 X |
| 3,176,618 | 4/1965 | Forsberg | 102—98 |
| 3,196,735 | 7/1965 | Baldwin | 102—98 X |
| 3,198,677 | 8/1965 | Thomas | 102—98 X |

BENJAMIN A. BORCHELT, *Primary Examiner.*

SAMUEL FEINBERG, *Examiner.*

R. F. STAHL, *Assistant Examiner.*